United States Patent [19]

Long

[11] Patent Number: 5,094,155
[45] Date of Patent: Mar. 10, 1992

[54] CONTINUOUS COOKING GRILL

[76] Inventor: Marshall Long, 11147 Old Harbour Rd., North Palm Beach, Fla. 33408

[21] Appl. No.: 549,910

[22] Filed: Jul. 9, 1990

Related U.S. Application Data

[60] Continuation-in-part of Ser. No. 266,671, Nov. 3, 1988, Pat. No. 4,938,342, which is a continuation-in-part of Ser. No. 82,835, Aug. 6, 1987, Pat. No. 4,796,745, which is a division of Ser. No. 802,705, Nov. 29, 1985, Pat. No. 4,686,894.

[51] Int. Cl.$^5$ .............................. A47J 37/04
[52] U.S. Cl. .............................. 99/386; 99/395; 99/400; 99/443 C; 99/444
[58] Field of Search ............... 99/386, 395, 397, 400, 99/444–446, 425, 443 C; 198/774.3, 775, 750; 219/388, 405

[56] References Cited

U.S. PATENT DOCUMENTS

| | | | |
|---|---|---|---|
| 2,112,309 | 3/1938 | Santillan | 99/423 |
| 3,646,879 | 3/1972 | Palmason et al. | 99/446 |
| 3,693,452 | 9/1972 | McGinley et al. | 99/386 |
| 3,739,712 | 6/1973 | Duning | 99/400 |
| 3,965,807 | 6/1976 | Baker | 99/386 |
| 4,151,791 | 5/1979 | Baker | 99/391 |
| 4,154,152 | 5/1979 | Lang-Ree et al. | 99/443 C |
| 4,176,589 | 12/1979 | Stuck | 99/443 C |
| 4,309,938 | 1/1982 | Harmon | 99/477 |
| 4,421,015 | 12/1983 | Masters et al. | 99/389 |
| 4,523,520 | 6/1985 | Hofmann et al. | 99/443 C |
| 4,686,894 | 8/1987 | Long | 99/386 |

Primary Examiner—Timothy F. Simone
Attorney, Agent, or Firm—Hovey, Williams, Timmons & Collins

[57] ABSTRACT

A continuous cooking grill is provided which includes a heating element for supplying radiant heat to food items passing therebetween along a conveyor which is preferably provided with a series of intercalated rods oriented transversely to the direction of travel. The conveyor includes both a straight portion and an arcuate portion for advancing the items in a generally U-shaped path. The cooker includes a bottom presenting a series of openings along and below the path of the food items which enables the drippings to pass unobstructed out of the cooker. The food items are inverted during their passage through the cooker at a location generally at the end of the bight of the U-shaped path by movement of the rods which causes the items to tumble downwardly from the arcuate portion onto the straight portion. The heating element is configured to generate radiant heat at a substantially constant distance from the food items during movement from the upper, arcuate portion to the lower, straight portion.

8 Claims, 6 Drawing Sheets

CONTINUOUS COOKING GRILL

This application is a continuation-in-part of application Ser. No. 07/266,671 filed Nov. 3, 1988, U.S. Pat. No. 4,938,342 which was a continuation-in-part of application Ser. No. 07/082,835 filed Aug. 6, 1987 now U.S. Pat. No. 4,796,745 issued Jan. 10, 1989, which was a division of application Ser. No. 06/802,705 filed Nov. 29, 1985, now U.S. Pat. No. 4,686,894 issued Aug. 18, 1987.

BACKGROUND OF THE INVENTION

1. Field of the Invention

The present invention relates to continuous grilling of food items after they enter the cooker, are advanced intermittently along a U-shaped path of travel and are discharged from the cooker, the grilling being accomplished on both sides of the food items by inversion of the articles at a point along the path which permits even cooking and which includes an open bottom to reduce smoke production during the cooking process.

2. Description of the Prior Art

Apparatus has heretofore been suggested for cooking food as it is moved along a circular cooking platform. Known additionally are automatic, oval cooking grills which turn the articles over to cook each side. Moreover, walking beam conveyors are somewhat commonplace.

However, in the field of continuous grilling of food, the improvements of my instant invention are novel from many important standpoints. I use a movable grid having spaced rods which interleave with the spaced rods of a stationary grid during raising of the food products off the latter and advancing the same along a U-shaped path each time the movable grid is actuated. Walking beams raise and shift two legs of the food-advancing grid whereas a tubular assembly controls the arcuate movement to advance the products from one to the other of the straight legs.

However, it has been learned that such cookers, while demonstrating improved grilling properties, may be prone to undesirable smoke production resulting from the accumulation of drippings in the bottom of the cooker. Yet further, more rapid and even cooking of the food items may be desired than the present designs may accomplish.

SUMMARY OF THE INVENTION

Thus, I have developed a new and improved cooker which serves to advance the food items such as hamburgers in a U-shaped path for grilling while reducing smoke production and achieving more even cooking of the items by inverting them near the end of their travel through the cooker.

The entire operation is effected by use of a single motor which not only actuates the walking beams but the tubular assembly at the inside center of the bight of two grids. The walking beams are provided with interleaved rods which advantageously are arranged for advancing the items along first a straight path of travel and then through an arcuate path. Cooking of the food items such a burger patties are accomplished by electric heating elements located above the rods. More than halfway along the bight of the U-shaped path the items are inverted by dropping the items from an upper section to a lower section. By locating the inversion point to a position nearer the end of the cooking region, the cooker hereof prevents the articles from being overdone on the second, "flipped" side and permits more efficient cooking.

The cooker hereof is provided with a substantially open bottom so that drippings from the food items will not be trapped therewithin and give rise to greater smoke production and possible fire hazard. By allowing the drippings, which are usually fatty and thus combustible, to fall outside the cooker and away from the cooking elements such as electric heaters, smoke production is drastically reduced. The drippings are free to fall into pans located below the cooker so that they may be cleaned or changed without interrupting the cooking process. The open bottom also effects improved access to the interior of the cooker for cleaning and maintenance.

DESCRIPTION OF THE PREFERRED EMBODIMENT

In the embodiment of FIGS. 1-8, a cooker 18 for broiling food items 20, such as hamburger patties (FIGS. 12-16), has a kettle 22 supported by legs 24 and carrying a cover 26 through use of hinges 28. After the items 20 enter one end of the kettle 22, they are advanced continuously by intermittent pulses along a U-shaped path and before emerging from the same end of the kettle 22, they are broiled on both sides as the result of being continuously subjected to heat thereabove emanating from electric heaters 30 carried by the cover 26 therewithin. Flipover of the items 20 midway their travel (FIGS. 12-16) occurs automatically as hereinafter explained.

A primary, stationary grid 32 has a U-shaped configuration to present a first elongated leg 34 which receive the items 20 exteriorly of the kettle 22 for advancement through an opening 36 in one end 38 of the kettle 22. The grid 32 has a semi-circular bight 40 at the opposite end 42 of the kettle 22, made up of a first quadrant 44, as a continuation of the leg 34, and a second quadrant 46 from which a second leg 48 extends, terminating outside the kettle 22 after passing through the opening 36, rendering the cooked items 20 accessible. The leg 48 is a continuation of the quadrant 46 and is disposed in spaced parallelism to the leg 34.

Figure 1:
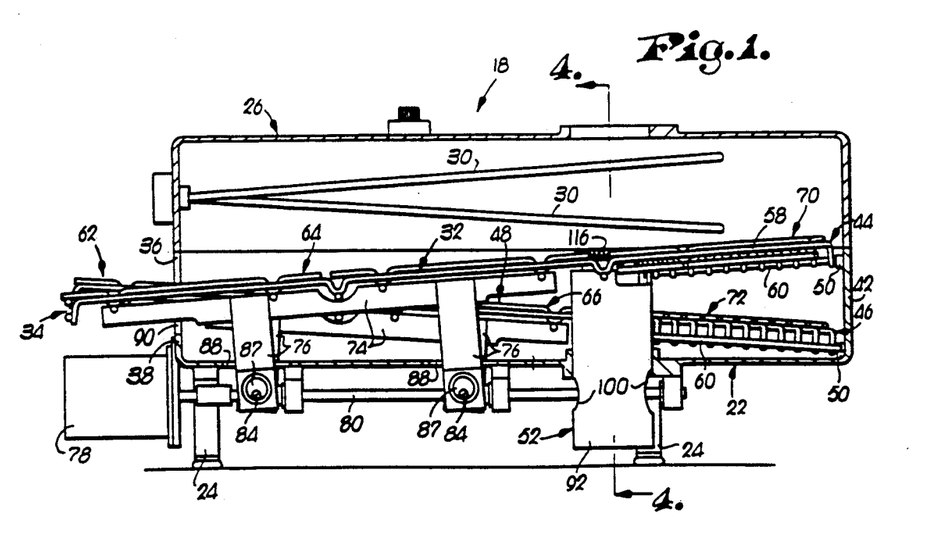
FIG. 1 is a side elevational view of a continuous cooking grill made according to one form of my present invention, the kettle and its cover being in section.
Figure 2:
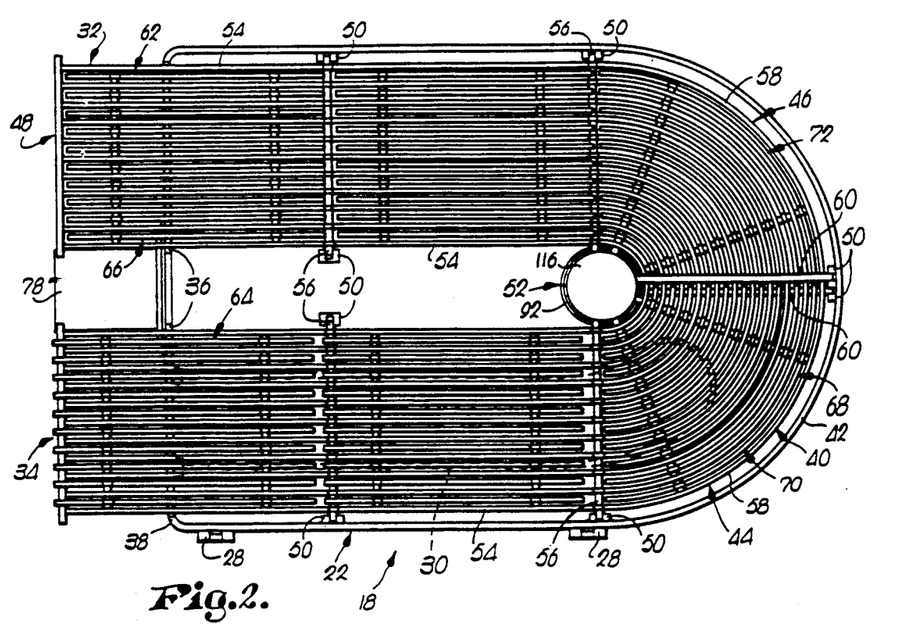
FIG. 2 is a top plan view thereof with the cover removed.

The leg 34 and its quadrant 44 slope upwardly as the end 38 of the kettle 22 is approached whereas the leg 48 and its quadrant 46 slope upwardly as the end 38 of the kettle 22 is approached, with the two U-shaped heaters 30 sloping accordingly (FIG. 1). The straight terminal ends of the quadrants 44 and 46 extend radially inwardly of the U-shaped end 42 with such end of the quadrant 44 spaced above the end of the quadrant 46 (FIG. 12-16).

The grid 32 is movably supported by the kettle 22 through use of open top, notched lugs 50 rigid to the kettle 22 and by an upstanding tubular assembly 52 extending through the bottom of the kettle 22 at the axe 22 at the axis of the bight 40. Each leg 34, 48 has a plurality of spaced, longitudinal rod elements 54 rigidly interconnected by cross bars 56, the latter of which rest in the lugs 50. The quadrant sections 44 and 46 have arcuate rod elements 58 joined by cross bars 60 at the terminal ends thereof, the bars 60 being supported by lugs 50 at the center of the wall 42 and by the assembly 52.

A U-shaped secondary grid 62, shiftable up and down intermittently relative to the grid 32 is provided with sloping legs 64 and 66 corresponding to the legs 34 and 48 respectively and a bight 68 corresponding to the bight 40. And, as in the case of the grid 32, the bight 40 has a pair of sloping sections 70, 72 in the form of quadrants corresponding to the quadrants 44 and 46 respectively. Once again, as shown, the removable legs 64, 66 have straight, spaced, parallel rod elements secured to cross bars, and the removable quadrants have arcuate rod elements secured to cross bars. However, each leg 64, 66 has a pair of separate, end-to-end parts, and the quadrants 70, 72 are separate from each other and from the legs 64, 66.

Each leg 64, 66 is supported by a pair of elongated, inclined, spaced, walking beams 74 extending from the exterior of the kettle 22 and through the opening 36, terminating adjacent the assembly 52. The upper edges of the beams 74 are notched to receive the cross bars of the legs 64, 66 and each beam 74 has a pair of spaced supporting members 76 depending therefrom.

A motor 78 has a drive shaft 80 rotatably suspended from the bottom of the kettle 22 and provided with a pair of bevel gears 82. Each of the four driven eccentric shafts 84, rotatably suspended from the bottom of the kettle 22 and corresponding with the members 76, is provided with a bevel gear 86. Two of the eccentric shafts 84 radiate from the shaft 80 in one direction and have their gears 86 in mesh with corresponding gears 82, whereas another pair of the eccentric 84 radiate in the opposite direction from the shaft 80 and also have their gears 86 in mesh with corresponding gears 82. Thus, the eccentric shafts 84 on one side of the shaft 80 are rotated in one direction and the opposite pair of eccentric shafts 84 are driven in the opposite direction by the shaft 80 during operation of the motor 78. Each member 76 has a circular hole rotatably receiving eccentric portion 87 of the shaft 84 (FIG. 1).

Figure 3:
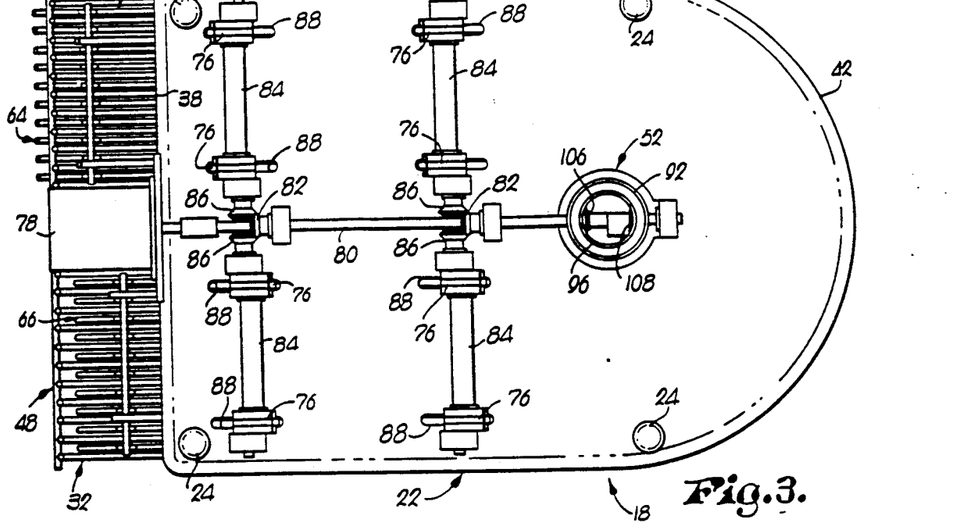
FIG. 3 is a view looking upwardly toward the bottom of the kettle.
Figure 4:
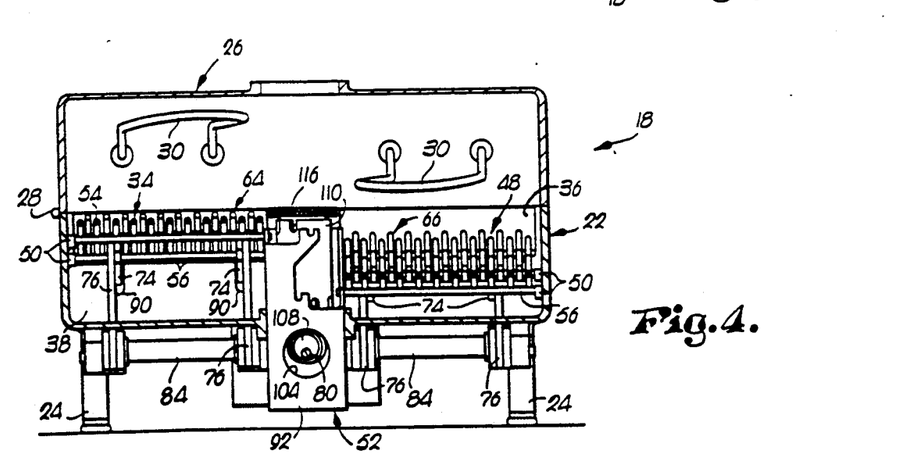
FIG. 4 is a cross sectional view taken on line 4—4 of FIG. 1.

Accordingly, the beams 74 and their legs 64, 66 travel through essentially circular paths. The leg 64 rises, progresses toward the quadrant 44, descends and regresses toward the end 38 during each cycle. Simultaneously, the leg 66 rises, progresses toward the end 38, descends and regresses toward the quadrant 46. The rods of the legs of the grid 62 rise above the legs 34, 48 to raise the items 20 off the legs 34, 48. After the items 20 on the leg 34 are raised, they are advanced toward the quadrant 44 and then set back onto the leg 34. Conversely, after the items 20 on the leg 48 are raised, they are advanced toward the end 38 and then set back onto the leg 48. Manifestly, such intermittent movement of the items 20 toward and away from the bight 40 takes place during each cycle of the beams 74. Incidentally, slots 88 in the bottom of the kettle 22 for clearing the members 76 are best shown in FIGS. 1 and 3, and slots 90 (FIG. 4) in the end 38 clear the beams 74. Not shown are two brackets which extend upwardly from the bottom of the kettle 22 for supporting the two lugs 50 shown in FIG. 2 between the legs 34 and 48.

Referring now in more detail to the assembly 52, especially FIGS. 5-8, there is provided an outer, upright tube 92, open at both ends and extending through the bottom of the kettle 22, to which the tube 92 is firmly attached. Bearings 94 in the tube 92 surround a vertically reciprocable, inner tube 96 which is oscillatory about its upright axis of reciprocation.

The tube 96 is so moved by the continuation of shaft 80 passing through diametrically opposed clearance openings 100 in the tube 92. The tube 96 has an oblong hole 102 with its major axis disposed vertically and an opposed, oblong hole 104 having its major axis disposed horizontally. A rotor 106 engaging the tube 96 in the hole 102 is eccentric to and rigid to the shaft 80, and a rotor 108 engaging the tube 96 in the hole 104 is eccentric to and also rigid to the shaft 80. A third tube 110 is an upper continuation of the tube 96, although separate therefrom, and a fourth tube 112 is surrounded by the tubes 96 and 110. A fifth tube 114 is disposed in the tube 110 at the upper end of the latter.

A knurled cap 116 has an inner flange 118 loosely fitted into the tube 114 and a bolt 120 rigid thereto and threaded into a bar 122 extending across the tube 112 and notched at its ends into the tubes 96 and 112. Fasteners 124 attach a closure plate 126 for the bottom of the tube 112 to the bar 122.

Figure 5:
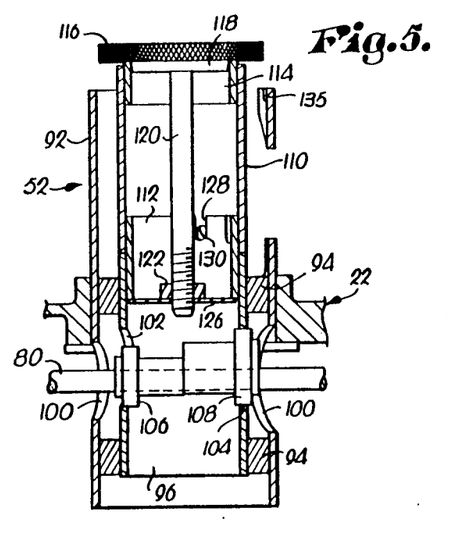
FIG. 5 is an enlarged, fragmentary, vertical cross sectional view through the tubular assembly at the axis of the quadrants of the grids.
Figure 6:
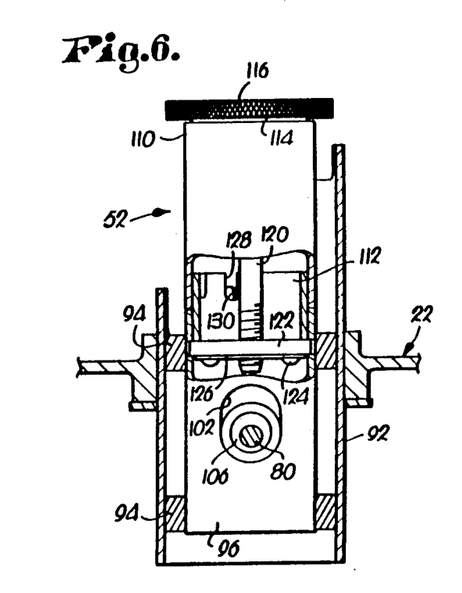
FIG. 6 is a fragmentary, elevational view of the tubular assembly, partially in section, taken at right angles to FIG. 5 looking toward the quadrants.
Figure 7:
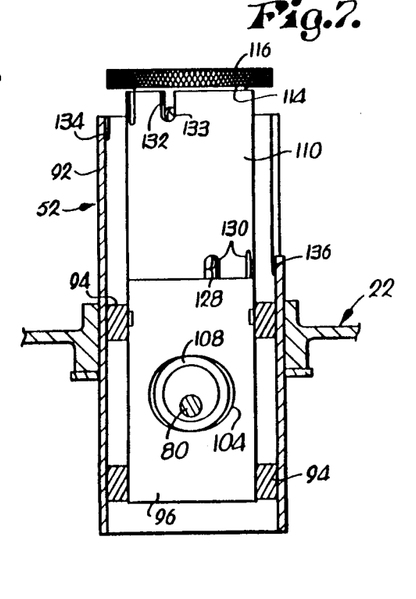
FIG. 7 is a view similar to FIG. 6 looking away from the quadrants.

Notches are illustrated in FIGS. 5-7 for releasably receiving certain components of the grid assemblies 32 and 62. The tube 112 has a number of such notches 128 at its upper edge for receiving the cross bars of the quadrant 72 which are, in turn, cleared by notches 130 in the tube 110. The tube 110 is also provided with notches 132 in its upper edge which correspond to notches 133 in tube 114 for receiving the cross bar at the terminal end of the quadrant 70. The outer tube 92 has notches 134 and 135 at its upper end which receive the proximal bars 56 and 60 respectively of the leg 34 whereas the cross bar 56 of the leg 48 is received in a long notch 136 in the tube 92.

Therefore, the grids 32 and 62 may be removed from the kettle 22 by first turning the cap 116 to release the bolt 120 from the bar 122. Then, by slipping the tube 114 from within the tube 110, the quadrant 70 is released from the notches 132 and 133. Next, the tube 110 may be slipped off the tube 112 to clear the notches 128 and 130 such as to release the quadrant 72, and the leg 34 as well as the quadrant 48 can be readily removed from the notches 134 and 136. The legs 34 and 48 are simply lifted out of the lugs 50 and the legs 64 and 66 are lifted off the beams 74.

OPERATION

A predetermined, elevated temperature is produced in the cooker 18 by use of a suitable control for the heaters 30, and a desired speed of rotation of the shaft 80 is selected by a suitable control for the motor 78. The food items 20 placed on the leg 34 of the grid 32 exteriorly of the cooker 18, are advanced through the opening 36 of the kettle 22, and cooling continues until they exit through the opening 36 on the leg 48 outside the wall 38.

Rotation of the shaft 80 causes the shafts 84 to rotate through the gears 82 and 86 causing rotation of all four eccentric shafts 84 in their corresponding members 76. Each time the leg 64 rises and progresses toward the quadrant 70, the items 20 are raised off the leg 34 and advanced toward the end 42 of the kettle 22. Simultaneously, each time the leg 66 rises and progresses away from the quadrant 72 the items 20 are raised off the leg 48 and advanced toward the end 38 of the kettle 42.

All the while, the shaft 80 rotates the rotors 106 and 108 continuously to oscillate and raise and lower the tube 96 as well as all parts carried thereby. This causes the quadrant 70 to raise the items 20 (received from the leg 64) and carry the items 20 along an arcuate path toward the quadrant 72.

As demonstrated by FIGS. 12-16, when the items 20 arrive at the discharge end of the quadrant 70 (such end extending radially inwardly from the end 42 of the kettle 22 toward the assembly 52), they tilt downwardly and then fall upside down onto the lower quadrant 72 as shown by the arrows. Immediately, the inverse side of the items 20 begin to cook, such cooking continuing throughout the arcuate movement along the quadrant 72 and the leg 66. Manifestly, the movement of the inverted items 20 along the quadrant 72 until delivered to the leg 66 also results from the rise and fall of the tube 96 by action of the rotor 108 and oscillation of the tube 96 during rotation of the rotor 106.

The up and down and arcuate movement is imparted from the assembly 52 to the quadrants 70 and 72 simultaneously with the quadrant 70 moving arcuately away from the leg 64 and the quadrant 72 moving arcuately toward the leg 66 during travel of the items along the bight 68. As in the case of the action imparted to the legs 64 and 66 by the beams 74, the assembly 52 causes the quadrants 70 and 72 to descend below the quadrants 44 and 46 and regress toward the leg 64 and away from the leg 66 during each cycle, depositing the items 20 back onto the quadrants 44 and 46 each time the quadrants 70 and 72 pass beneath the upper surfaces of the quadrants 44 and 46.

During the successive, intermittent advancements of the items 20 along the leg 34, thence along the bight 40 and finally along the leg 48, they are continuously cooked on both sides to the extent desired by adjustment of the heaters 30 and/or the speed of the motor 78 prior to successive emergence of the items 20 from the end 38 of the kettle 22. While conveyance of the items 20 is not continual, there is no pause except somewhat momentarily each time the items come to rest on the grid 32.

Figure 8:
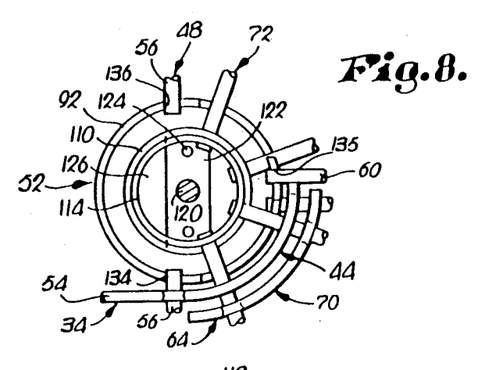
FIG. 8 is a fragmentary top plan view of the tubular assembly and certain grid work with the lid removed.
Figure 9:
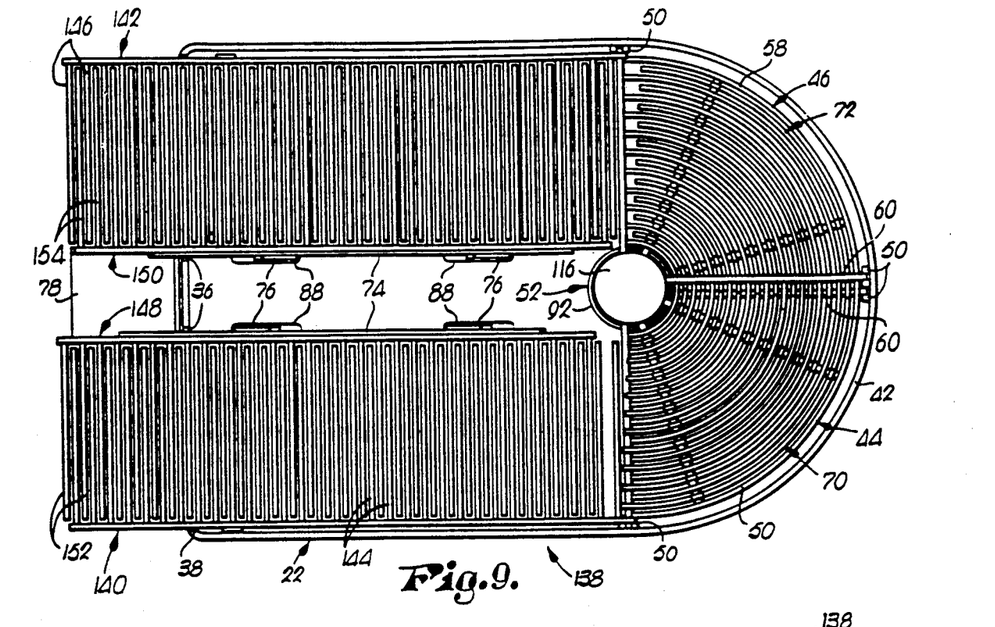
FIG. 9 is a view similar to FIG. 2 showing a modified form of the grill.
Figures 10, 11:
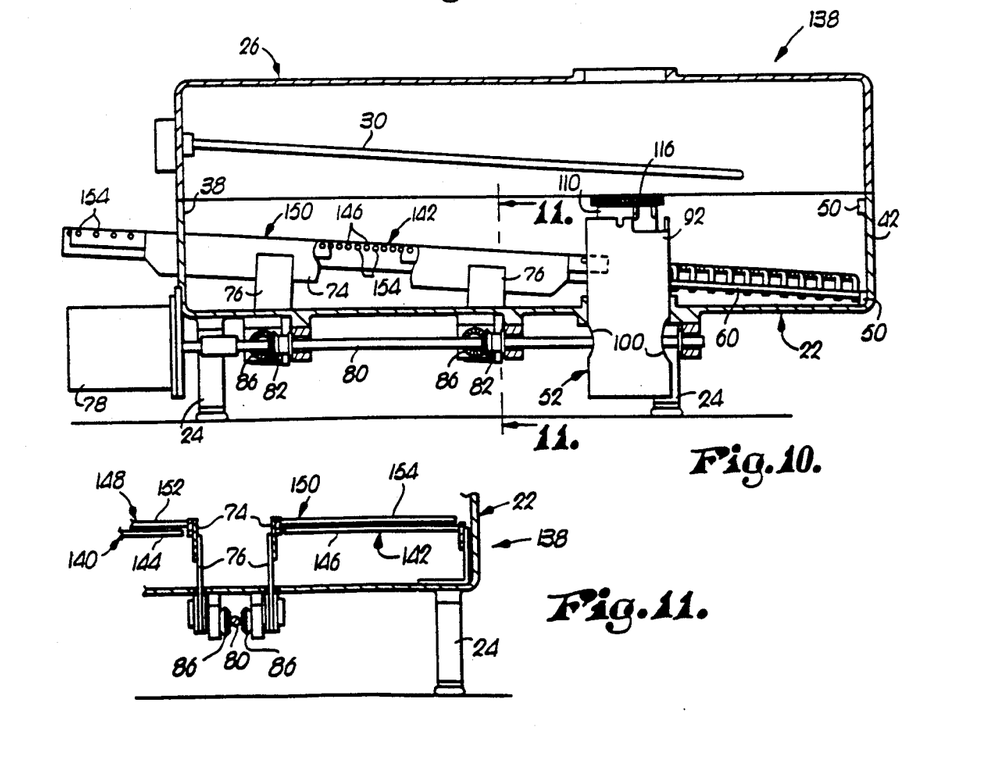
FIG. 10 is a view similar to FIG. 1 of the grill shown in FIG. 9.
FIG. 11 is a fragmentary cross sectional view taken on line 11—11 of FIG. 10.
Figures 12, 13:
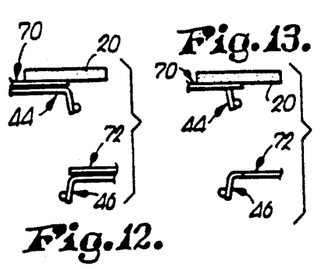
FIGS. 12-16 inclusive, are diagrammatical views showing the inversion of a food item broiled by the cookers.
Figure 14:
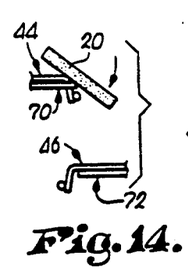
Figure 15:
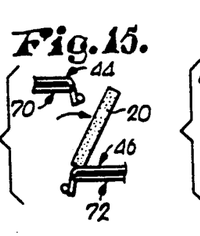
Figure 16:
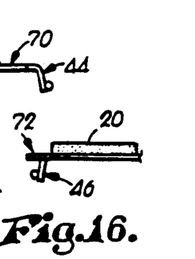

A cooker 138 as shown in FIGS. 9-11, differs from the cooker 18 of FIGS. 1-8 only with respect to the nature of the two legs of the stationary grid and of the movable grid. Therefore, the same numerals are used with respect to components which are the same in both cookers 18 and 138. Legs 140 and 142 of the stationary grid have rods 144 and 146 rigidly secured to the kettle 22 and extending inwardly from corresponding sides of the kettle 22. The spaced rods 144 continue from the exterior of the end wall 38 to the quadrant 44 and the spaced rods 146 continue from the quadrant 46 to and through the opening 36.

On the other hand, legs 148 and 150 of the movable grid each have a series of rods 152 and 154 extending toward the sides of the kettle 22. Once again the rods 152 continue through the opening 36 to the quadrant 70 and the rods 154 extend from the quadrant 72, terminating beyond the end wall 38. The inner ends of the rods 152 and 154 are secured to corresponding beams 74 carried by members 76 actuated by the motor 78 as above explained.

While the cookers 18 and 138 as described above contemplate a stationary grid, e.g. the primary grid 32 and a movable grid, e.g. the secondary grid 62, it is contemplated that both grids be movable if such is to be desired. It has been fully illustrated and carefully explained above how the grid 62 is caused to be moved in relation to the grid 32. As an additional embodiment, I contemplate that the grid 32 be moved in the same manner and through use of the same structural components as employed in connection with the grid 62, and duplication of such components for the grid 32 has not, therefore, been included in the drawings.

It is but necessary to further explain that the two movable grids would move alternately such that one would arrive at its greatest height as the other grid arrives at its lowermost position. Each grid would advance the product the same distance during each cycle of movement. Hence, the speed of advancement of each product would be doubled and, if as such result, the products are not sufficiently cooked by the time they emerge from the cookers 18 or 138, one need merely reduce the speed of motor 98.

Figure 17:
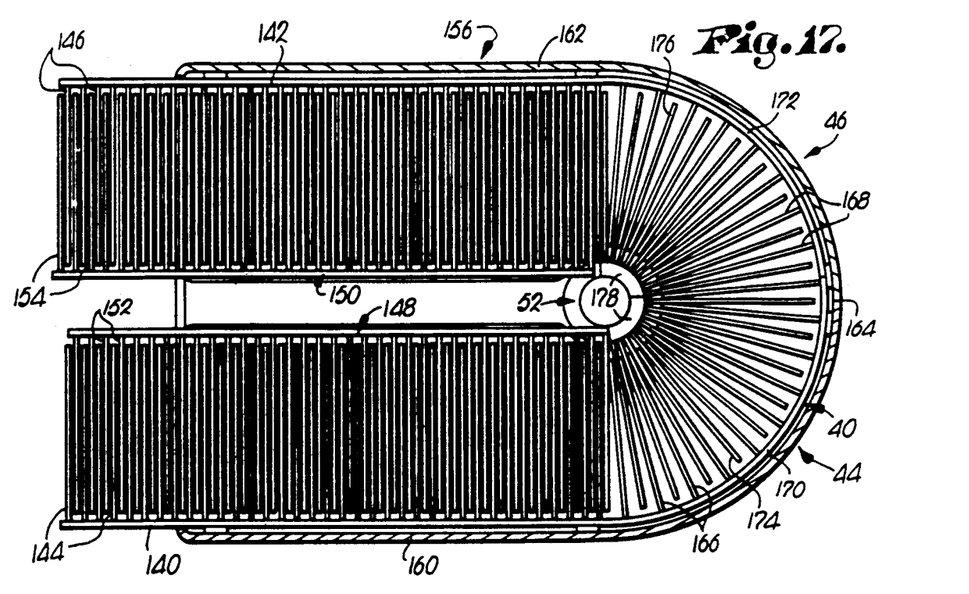
FIG. 17 is a top plan view similar to FIG. 2 showing a modified form of the grill.
Figure 18:
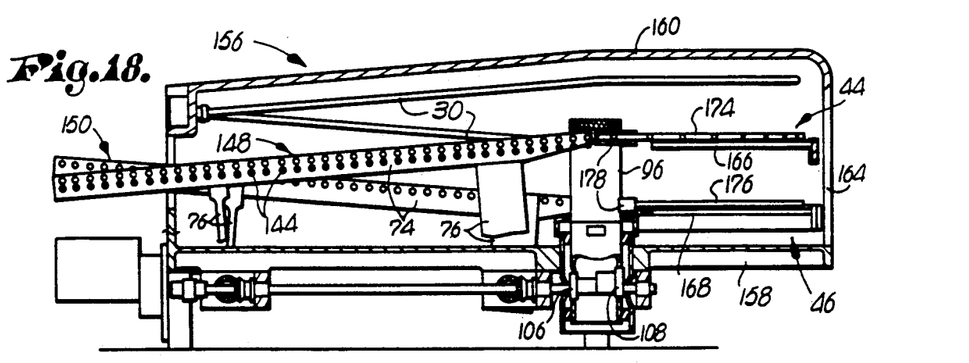
FIG. 18 is a side elevational view similar to FIG. 1 showing the grill of FIG. 17.
Figure 19:
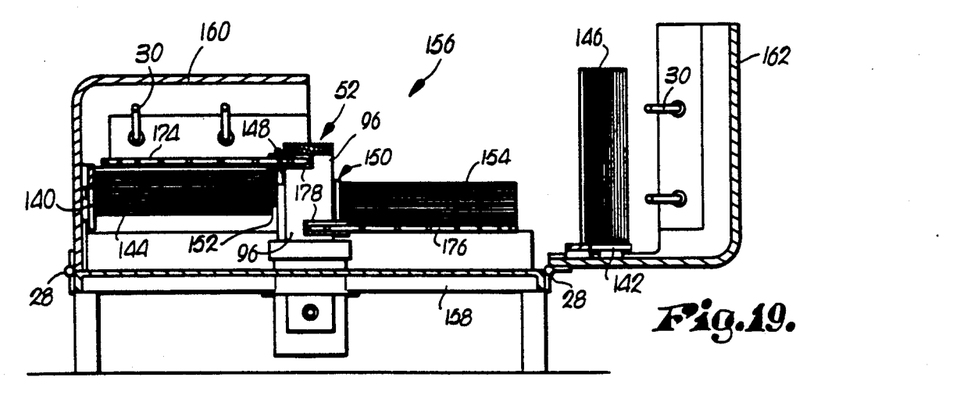
FIG. 19 is a cross sectional front elevational view of the grill of FIG. 17 similar to FIG. 4 but showing a portion of the hinged cover and stationary bars in an opened position.

A cooker 156 as shown in FIGS. 17-19 is similarly to the cooker 138 except that radially and inwardly extending rods are substituted for quadrants 70 and 72 and rods which cyclically and successively raise, advance, lower and recede are substituted for quadrants 44 and 46. Therefore, the same numerals are used with respect to components which are the same as in cookers 18 and 138.

As in FIGS. 9-11, cooker 156 has legs 140 and 142 with corresponding spaced, stationary rods 144 and 146, and legs 148 and 150 of the movable grid with corresponding rods 152 and 154 secured to corresponding beam 74 and carried by member 76. However, in cooker 156, separate hinged covers 160 and 162 are pivotally mounted to kettle 158 by hinges 28. Covers 160 and 162 each carry heating elements 30 in the stationary rods 144 and leg 140 and stationary rods 146 and leg 142 are respectively mounted thereto. The covers 160 and 162 meet at junction 164 when in the closed, cooking position.

The cooker 156 also differs from cooker 138 with respect to the means for advancing the patties 20 through bight 40. The series of spaced, radially inwardly directed stationary rods 166 and 168 are mounted to arcuate legs 170 and 172 which are in turn mounted to covers 160 and 162 respectively. The leg 170 is a continuation of leg 148 and extends to junction 164 and corresponds to quadrant 70 of FIGS. 9-11. Leg 172 corresponds to quadrant 72 in FIGS. 9-11 and extends from junction 164 to leg 150. Stationary rods 168 are in a vertically lower plane than the plane defined by rods 166 and correspond to quadrant 72 in FIGS. 9-11. The stationary rods 166 and 168 extend inwardly in the manner of spokes toward assembly 52.

Orbiting rods 174, 176 corresponding respectively to quadrants 44, 46 in FIGS. 9-11, are interleaved between stationary rods 166, 168 and extend radially outwardly from inner tube 96 of assembly 52. As in the previous embodiments, inner tube 96 is engaged by rotor 106 to oscillate and thereby raise, advance, lower and recede orbiting rods 174 and 176 mounted to the tube 96 with respect to stationary rods 166, 168. Orbiting rods 174, 176 are removably mounted to brackets 178 carried by tube 96, by threaded ends on the rods, by pins or collars, or other conventional means. FIG. 8 shows a similar arrangement of rods, with quadrant 72 attached to tubes 110 and 96 (below tube 110); and in cooker 156 the number of rods 174, 176 are preferably greater than the radially extending rods comprising quadrant 72 in FIG. 8.

The manner of operation of cooker 156 is similar to cookers 18 and 138, in that the food items 20 placed on leg 34 of the grill are advanced as rods 152 move in an orbital and surrounding manner about adjacent stationary rods 144. In this manner, the food items 20 are successively "walked" along stationary rods 144 by successive lifting and advancing by rods 152 until the food items 20 have traveled the distance from end 38 to leg 170. As is shown in FIG. 18, food items 20 also move upward on an incline and receive heat from element 30.

Upon reaching leg 170, the food items 20 continue in an arcuate, counterclockwise path along bight 40. Tube 96 moves in an oscillatory manner while driven by rotors 106, 108. Each orbiting rod 174, 176 moves in unison with rods 152 and 154, and encircles respective adjacent stationary rod 166, 168 in surrounding relationship. Thus, when food item 20 is received from legs 140, 148, it is carried and advanced in a curved path in the counterclockwise direction as shown in FIG. 17. The orbiting rods 174, 176 receive the food item 20 from legs 140, 148 and continue their successive and cyclical motion of raising, advancing, lowering and receding in surrounding relationship to stationary rods 166, 168 located adjacent thereto. The food item 20 is deposited and remains on the next forward stationary rods 166 as the orbiting rod 172 moves beneath and rearwardly its adjacent stationary rod 166 before moving upward to carry another food item 20 forward.

Rods 166 and 174 are disposed in the first portion of bight 40 corresponding to leg 170, with the last rod 166 and first rod 168 of leg 174 being superposed in a vertical plane opposite junction 166. When a food item reaches the last rod 166, it falls downward and simultaneously turns over when the last orbiting rod 174 engages the food item 10 on an upward movement. This turning-over process is shown in FIGS. 12-16 and has been previously described. In the present embodiment, orbiting rods 174 correspond to quadrant 44 while stationary rods 166 correspond to quadrant 70 of FIGS. 12-16. Similarly, orbiting rods 176 correspond to quadrant 46 and stationary rods 168 correspond to quadrant 72 of FIGS. 12-16. As food item 20 engages the first of rods 166 of leg 170, the first of the orbiting rods 176 begin to successively advance the food item 20 until it reaches leg 142. the food item 20 then advances along leg 42 by successive oscillations of rod 154 until the food items 20 exit the cooker 158 through opening 36.

The embodiment of FIGS. 17-19 is especially useful when it is desired to clean the cooker 158. As shown in FIG. 19, because legs 140 and 170 are mounted to cover 160, and legs 142 and 172 are mounted to cover 162, the interior of the cooker 58 is easily accessible during cleaning.

Figure 20:
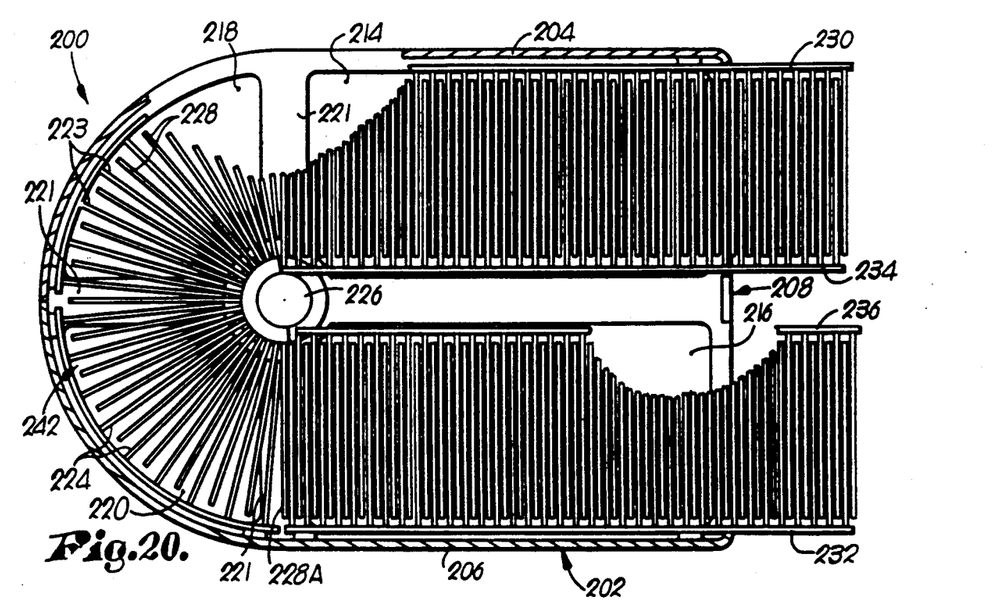
FIG. 20 is a top plan view similar to FIGS. 2, 9 and 17 showing a modified form of the grill hereof with portions of the rods removed to show the open bottom area.
Figure 21:
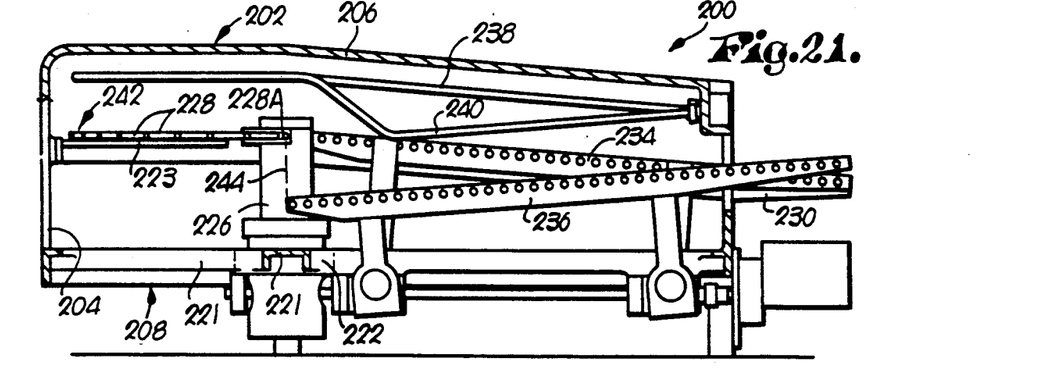
FIG. 21 is a right side elevational view of a continuous cooking grill of FIG. 20, the cover and bottom kettle being in section.
Figure 22:
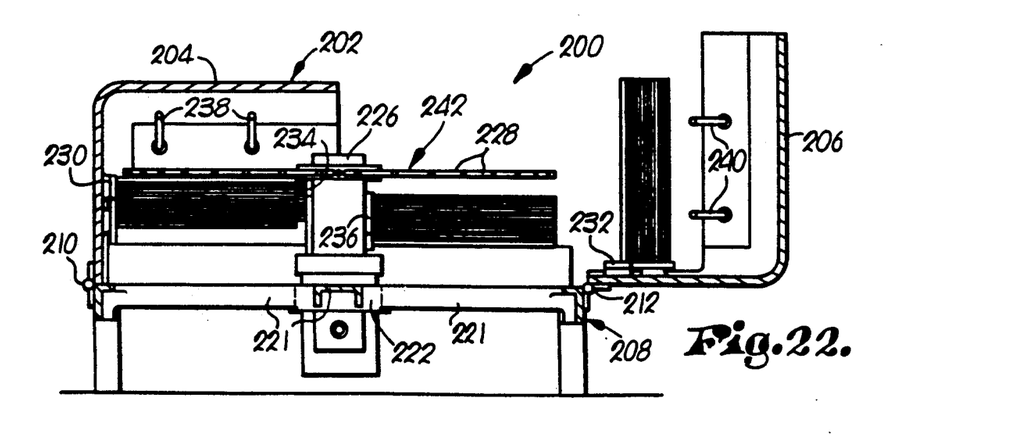
FIG. 22 is a view similar to FIG. 19 of the cooker of FIG. 20 showing a portion of the hinged cover and stationary bars in an open position.

In the embodiment shown in FIGS. 20-22, a cooker 200 is provided which is similar in many respects to the cooker 156 as shown in FIGS. 17-19. However, the cooker 200 is provided with an enclosure 202 have a pair of covers 204 and 206 which are pivotally mounted to a bottom 208 by hinges 210 and 212. In contrast to kettle 22, the bottom 208 defines four large open areas 214, 216, 218 and 220 to permit drippings from the food items 20 to drop directly downwardly and pass therethrough for collection in pans or other receptacles on the floor on which the cooker 200 rests. As may be seen in the drawing, bottom 208 is elevated relative to a floor or other surface supporting the cooker 200 so that the drippings may fall free of the bottom 208. Openings 218 and 220 are located directly beneath the circular portion of the path followed by the food items 20 and are defined by spokes 221 of bottom 208.

The cooker 200 also includes structure defining a novel cooking path which differs from the previous embodiments. That is to say, elongated stationary rods 223 and 224 are attached to the cover and are arranged in substantially a full semicircle in a common horizontal plane and are directed radially inwardly toward assembly 226 which is similar to assembly 52 shown in FIGS. 17-19. Stationary rods 223 are connected to and supported by cover 204 while stationary rods 224 are connected to and supported by cover 206. As mentioned previously, covers 204 and 206 are mounted on hinges 210 and 212 so that the covers and the stationary rods mounted thereto may be opened for easy access during cleaning.

Orbiting rods 228 are directed radially outwardly from assembly 226 to which they are attached. The orbiting rods 228 are interleaved and thus intercalated with stationary rods 223 and 224 as shown in FIG. 20. The orbiting rods 228 are arrayed in a common horizontal plane, and are arrayed in substantially a full semicircle. In all other respects, the arrangement and mounting of the orbiting rods 228 and assembly 226 is the same as in the embodiments shown in FIGS. 17-19 and the accompanying description thereof.

The cooker 200 includes legs 230, 232, 234 and 236 which are identical in construction and operation to the legs 140, 142, 148 and 150 as shown in FIGS. 9-19 and described hereinabove. A pair of overhead electric heating elements 238, 240 are provided which are mounted on covers 204 and 206 respectively. The heating element 238 is substantially the same as heating element 30 shown and described hereinabove, but heating element 240 is provided with a lazy S-shape when viewed from a side elevation as shown in FIG. 21 for supplying heat to the food items at both a higher level while they move along the stationary rods 223 and 224 and orbiting rods 228. The shape of the heating element 240 serves to supply substantially continuous heat to the food items at a relatively constant intensity both before and after inversion by virtue of its shape which locates the heating element at a substantially even distance from the food items during movement therebeneath.

In operation, the food items 20 as shown in FIGS. 12-16 are first advanced along legs 230 and 234 in a generally inclined path, with overhead element 238 supplying heat to the top side of the items 20. As in the previous embodiments, the leg 230 is stationary and leg 238 moves in a vertical plane in a circular manner so that the rods attached thereto oscillate around the rods of leg 230. The food items are then advanced into the bight of the U-shaped cooker 200 and deposited on stationary rods 223. The assembly 226 then serves to oscillate the orbiting rods 228 around the stationary rods 223 and 224 to advance the food items 20 along a circular path.

In the embodiment of FIGS. 20 through 23, the food items keep their top side up during the entire movement through the bight portion 242 of the cooker 200 which is to say that portion of the cooker 200 wherein the food items 20 move in an arcuate path. At the end of the bight portion 242, the food items are inverted so that the side of the food items which were previously on top are now facing downwardly and the previous bottom side is facing up toward the heating element 240. The inversion takes place as the food items leave the last orbiting rod 228 which is elevated relative to legs 232 and 236, so that the food item 20 flips over as shown in FIGS. 12-16. The line of inversion 244 generally signifies the location where the food items move from the bight portion 242 to a straight path along legs 232 and 236. The food items 20 then advance along legs 232 and 236 in the same manner as along legs 230 and 234 as described hereinabove until they exit beyond the heating element 240 and the cover 206. Because the food items 20 have been found to cook more quickly if exposed to broiling heat by heating elements 238 and 242 on the first, top side thereof for a longer duration than the second, initially bottom side after inversion, the present apparatus enables the food items to be advance throgh the cooker 200 more rapidly than in previous embodiments.

After the cooker 200 is shut down, cleaning and maintenance may be easily accomplished because not only may a worker easily gain access to the cooker 200 by pivoting covers 204 and 206 to clean the heating elements, legs and assembly 226 from above, but the worker may also gain access through openings 214, 216, 218, and 220 to clean the underside of the legs and assembly 226. Yet further, the presence of openings 214, 216, 218 and 220 may yield longer periods of operation for the cooker 200 without cleaning because the openings permit the drippings from accumulating therein to any significant extent and allow the drippings to remain at a greater distance from heating elements 238 and 240 until the pans in which they are normally collected are removed.

I claim:

1. A continuous cooking grill for cooking and conveying a food item therethrough comprising:
   a heating element;
   means for advancing said food item along a path substantially beneath said heating element, said path including an arcuate portion and a substantially straight portion, there being means associated with said advancing means for inverting said food item during travel along said path;
   a bottom located beneath said advancing means including means defining at least one opening directly below said advancing means for allowing drippings generated during cooking of said food items to pass therethrough and out of said grill; and
   means for positioning said heating element above said path without any heating element being located below said path for preventing said grill from generating excessive smoke caused by said drippings falling onto a heated surface.

2. A continuous cooking grill as set forth in claim 1 wherein said advancing means includes a plurality of intercalated rods including means for initiating relative movement of adjacent rods in a direction generally transverse to their longitudinal axis for advancing a food item in said generally transverse direction therealong.

3. A continuous cooking grill as set forth in claim 2 including means for elevating said bottom above a surface supporting said cooker.

4. A continuous cooking grill as set forth in claim 2 wherein said arcuate portion presents an upstream end and a downstream end and is substantially continuous in a common horizontal plane therealong and said substantially straight portion is located immediately downstream from said downstream end, the downstream end of said arcuate portion being elevated relative to said substantially straight portion.

5. A continuous cooking grill as set forth in claim 4 wherein said heating element is located above at least a part of both said straight portion and said arcuate portion and is configured to be in substantially constant spaced relationship from said part of both said straight portion and said arcuate portion for cooking said food items during movement along said advancing means.

6. A continuous cooking grill for cooking and conveying a food item therethrough comprising:
   an enclosure including a cover, said enclosure defining an entrance and an exit; a conveying mechanism for advancing the food item from said entrance to said exit;
   a heating element located above said conveying mechanism and intermediate said cover and said conveying mechanism for cooking the food item during movement along said conveying mechanism without any heating element being located below said conveying mechanism for preventing the generation of excessive smoke caused by said drippings falling onto a heated surface; and
   means associated with the conveying mechanism for inverting the food item during movement along the conveying mechanism,
   said enclosure including a bottom presenting a substantially open area located beneath said conveying mechanism for enabling drippings generated during cooking of the food item to drop downwardly out of the grill.

7. A continuous cooking grill as set forth in claim 6 wherein said conveying mechanism defines an arcuate path for movement of the food item therealong during at least a portion of its movement from the entrance to the exit.

8. A continuous cooking grill as set forth in claim 6 including a plurality of support legs for elevating the bottom above a supporting surface.

* * * * *